United States Patent
Buzbee

[19]

[11] Patent Number: 5,854,928
[45] Date of Patent: Dec. 29, 1998

[54] USE OF RUN-TIME CODE GENERATION TO CREATE SPECULATION RECOVERY CODE IN A COMPUTER SYSTEM

[75] Inventor: William B. Buzbee, Half Moon Bay, Calif.

[73] Assignee: Hewlett-Packard Company, Palo Alto, Calif.

[21] Appl. No.: 726,760

[22] Filed: Oct. 10, 1996

[51] Int. Cl.[6] ............................... G06F 9/46; G06F 9/40
[52] U.S. Cl. .................... 395/705; 395/591; 395/706; 395/707; 395/709
[58] Field of Search ...................... 395/704–710, 395/183.14, 591, 185.02, 685, 185.03, 800.23, 183.11, 185.01, 651, 182.13, 182.15

[56] References Cited

U.S. PATENT DOCUMENTS

| | | | |
|---|---|---|---|
| 4,740,969 | 4/1988 | Fremont | 395/182.13 |
| 4,763,248 | 8/1988 | Kitada | 395/185.01 |
| 5,448,737 | 9/1995 | Burke et al. | 395/709 |
| 5,481,699 | 1/1996 | Saether | 395/182.13 |
| 5,577,200 | 11/1996 | Abramson et al. | 395/185.03 |
| 5,617,558 | 4/1997 | Kelley | 711/166 |
| 5,625,835 | 4/1997 | Ebcioglu et al. | 395/800.23 |
| 5,680,565 | 10/1997 | Glew et al. | 711/205 |
| 5,692,169 | 11/1997 | Kathail et al. | 395/591 |
| 5,721,855 | 2/1998 | Hinton et al. | 395/394 |
| 5,748,936 | 5/1998 | Karp et al. | 395/394 |
| 5,761,467 | 6/1998 | Ando | 395/376 |

OTHER PUBLICATIONS

R. Cmelik, D. Keppel "Shade: A Fast Instruction–Set Simulator for Execution Profiling", 1994 ACM Sigmetrics Conference, 1994.

R. Cmelik, D. Keppel "Shade: A Fast Instruction–Set Simulator for Execution Profiling", Technical Report UWCSE 93–06–06, 1993.

T. Halfhill, "Emulation: RISC's Secret Weapon" BYTE Apr. 1994, pp. 119, 120, 122 ,124, 126, 128, 130.

*Primary Examiner*—James P. Trammell
*Assistant Examiner*—Cuong H. Nguyen

[57] ABSTRACT

In a computer system, programming code includes speculative code. The speculative code is code which is executed early based on speculation that the results from execution of the speculative code will be needed in the future. When executing instructions within a speculative sequence of code which includes memory accesses, any memory faults are ignored. When utilizing data generated during the speculative sequence of code a determination is made as to whether any memory fault occurred when the speculative sequence of code was executed. If it is determined that a memory fault occurred when the speculative sequence of code was executed, recovery code is generated which when executed performs a recovery from the memory fault.

18 Claims, 2 Drawing Sheets

USE OF RUN-TIME CODE GENERATION TO CREATE SPECULATION RECOVERY CODE IN A COMPUTER SYSTEM

BACKGROUND

The present invention concerns execution of programs on a computing system and pertains particularly to the use of run-time code generation to create speculation recovery code.

Programs are generally written in a high level programming language. This high level language, often referred to as source code, is translated by a compiler program into an assembly language. The binary form of the assembly language, called object code, is the form of the code actually executed by a computer. The object code is generally first produced in object code modules which are linked together by a linker. For the purpose of the present application, the term "compile" includes both the process of producing the object code modules and linking the object code modules together.

One modern optimization technique is speculative execution, or speculation. In order to perform speculative execution, the compiler arranges code such that an action which the compiler believes will be needed in the future is performed early, or speculatively. The portion of code which is executed early is called speculative code. If it turns out that the actions performed by the speculative code did need to be done, since the speculative code has been executed early, this will speed execution of the code. In the actions turn out not to be needed, the results calculated by the speculative code are discarded.

A requirement of speculation is that speculatively executed code does not introduce any externally visible behavior different from an unspeculated version. However, because the use of speculation rearranges relative time of execution of certain actions, an exception in speculative code which results in invocation of a trap handler, for example to handle a memory fault, often requires the execution of special recovery code for proper operation. In such a case, very aggressive use of speculation can require a vast volume of recovery code. However, this recovery code takes up space in the executable file. This is an inefficient use of memory space since it is extremely rare that any specific recovery code needs to be utilized.

SUMMARY OF THE INVENTION

In accordance with the preferred embodiment of the present invention, programming code includes speculative code. The speculative code is code which is executed early based on speculation that the results from execution of the speculative code will be needed in the future. When executing instructions within a speculative sequence of code which includes memory accesses, any memory faults are ignored. When utilizing data generated during the speculative sequence of code a determination is made as to whether any memory fault occurred when the speculative sequence of code was executed. If it is determined that a memory fault occurred when the speculative sequence of code was executed, recovery code is generated which, when executed, performs a recovery from the memory fault.

For example, a dynamic translator creates recovery code which, when executed, re-performs any operations which were corrupted by the memory fault. In one embodiment of the present invention, the dynamic translator uses code annotations provided by an optimizing compiler. The optimizing compiler inserts the code annotations into the programming code during compile time. In another embodiment of the present invention, the dynamic translator uses a compact representation of the recovery code provided by the optimizing compiler. The optimizing compiler inserts the compact representation of the recovery code into the programming code during compile time.

The present invention allows for more efficient use of space within programming code by providing for the runtime generation of recovery code which recovers from a memory fault originating in speculatively executed code and detected during use of the results of the speculatively executed code.

DESCRIPTION OF THE PREFERRED EMBODIMENT

Figure 1:
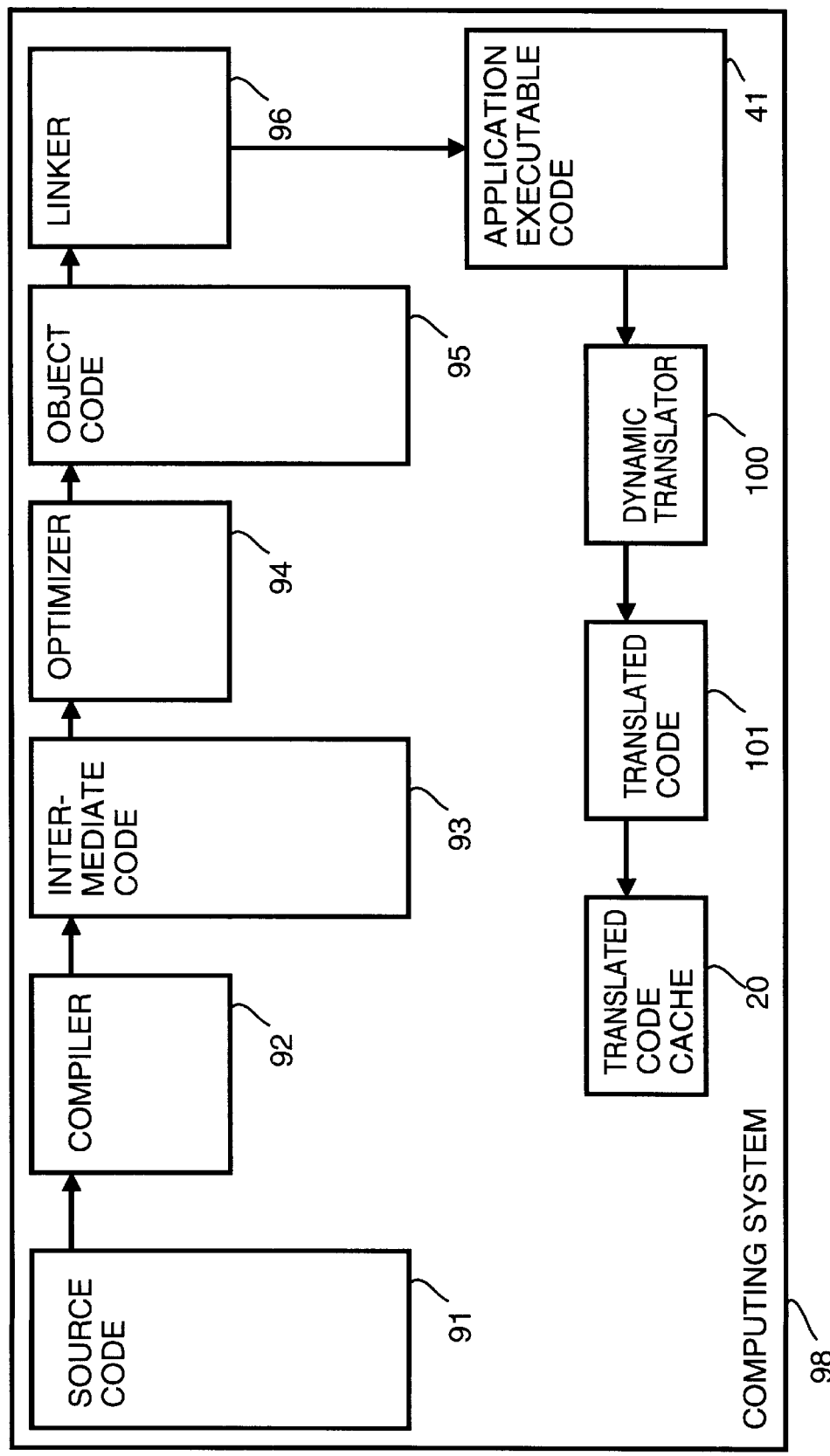
FIG. 1 shows a block diagram of a computing system which utilizes a compiler to produce executable code which is executed in a system which includes a dynamic translator in accordance with a preferred embodiment of the present invention.

FIG. 1 shows a block diagram of a computer system 98 which uses a compiler system to produce executable code for an application. A compiler 92 receives source code 91 and produces intermediate code 93. The intermediate code is a list of object (assembly) language instructions. An optimizer 94 receives the intermediate code 93 and produces optimized object code 95. A linker 96 receives optimized object code 95 and produces application executable code 41 (also called application 41). Application executable code 41 may then be executed by computing system 98. Compiler 92, optimizer 94 and linker 96 together form an optimizing compiler. Actions performed by compiler 92, optimizer 94 and/or linker 96 are done during compile time.

Computer system 98 shown in FIG. 1 additionally includes a dynamic translator 100 which can used to produce translated code during runtime. When using dynamic translator 100, blocks of code from application executable code 41 are translated at execution time (runtime). The translated blocks of code are shown in FIG. 1 as translated code 101. Translated code 101 is stored in memory (e.g., cache memory) so that each block of code which is executed a number of times need be translated only once during runtime. This approach allows the flexibility of not requiring that code be translated before runtime, but reduces the overhead that would result if a block of code were translated every time it was executed.

In the preferred embodiment, translated code 101 is stored in a translated code cache 20. When translated code cache 20 is full, it may be necessary to discard some previously translated blocks of code in order to make room for newly translated blocks of code. This will require the blocks of code which were discarded to be retranslated if they are used again, but does allow for potential savings in memory usage. Alternately, rather than discarding previously translated blocks of code, they can be stored in system memory.

Translation may be used to generate recovery code required for correct execution of speculatively executed code. Specifically, in order to perform speculative execution, the compiler arranges code such that an action which the compiler believes will be needed in the future is performed early, or speculatively. If it turns out that the actions did need to be done, since they already have been done, this will speed execution of the code. In the actions turn out not to be needed, the speculatively computed results are discarded.

For example, Table 1 below shows an example of code. The example is in the programming language C.

TABLE 1

```
if((a/b) > 3.2) {
    c = *d + 1;
}
```

In the example of code shown in Table 1, the variables "a" and "b" are floating point numbers, the variable "c" is an integer and the variable "*d" is the integer pointed to by the pointer "d". The statement "c=*d+1" needs to be executed if the condition clause ((a/b)>3.2) is true. Normally, compiler 92 will generate code such that the condition clause ((a/b)>3.2) is computed and then the following statement "c=*d+1" is executed only if the condition clause ((a/b)>3.2) is true.

However, many modern computers have multiple arithmetic functional units which can operate in parallel. In such computers, it can speed execution of code such as that set out in Table 1 above, to perform a portion of the statement "c=*d+1" prior to or in parallel with the condition clause ((a/b)>3.2). In order, to facilitate such parallel execution, optimizer 94 reorders the example of code in Table 1, for example, to look like the code in Table 2 below.

TABLE 2

```
temp = *d + 1;     [speculatively executed code]
if((a/b) > 3.2) {
    c = temp;
}
```

In the example of code shown in Table 2, the statement "c=temp" is executed if the condition clause ((a/b)>3.2) is true. If the condition clause ((a/b)>3.2) is false, the speculatively executed result (*d+1) stored in "temp" is simply not used and is effectively discarded.

The simple re-ordering of code in Table 2 below can present a problem. Specifically, a requirement of speculation is that speculatively executed code does not introduce any externally visible behavior different from an unspeculated version. In the code set out in Table 2, if the pointer "d" is invalid, de-referencing pointer "d" (i.e., using pointer "d" to access the integer "*d") will cause a memory fault. This memory fault will occur when the code in Table 2 is executed.

However, when executing the code in Table 1, if the condition clause ((a/b)>3.2) is always false, the pointer "d" is never de-referenced and the memory fault will never be exposed. Because executing the code in Table 2 may result in handling a memory fault which might not be detected when executing the code in Table 1, the executing the speculative code in Table 2 may introduce externally visible behavior different from the unspeculated version of the code in Table 1.

A solution to the above problem is to architecturally define a mechanism for delaying faults on speculatively executed memory references until it is assured that the speculatively executed code is truly needed. When the speculatively executed code is truly needed, then there can be memory references without fear of incorrectly exposing a memory fault. This is illustrated by assembly language code set out in Table 3 and Table 4 below. Table 3 sets out an assembly language version of the code set out in Table 1 above. The code in Table 3 is in assembly language used for Precision Architecture (PA) 1.1. Further information about Precision Architecture is available from Hewlett-Packard Company.

TABLE 3

| //** if((a/b) > 3.2) {**// | |
|---|---|
| FDW a,b,ftemp | ; divide a by b |
| FCMP, > ftemp,3,2 | ;compare to 3.2 |
| B,n out | ; Conditional branch around |
|  | ; clause |
| //** c = *d + 1 **// | |
| LDW 0 (d), temp | ; De-reference d |
| ADDI 1,temp,temp | ; add 1 to *d |
| COPY temp,c | ; Place incremented value in c |
| out: | |

Table 4 sets out speculative assembly code version of the assembly language set out in Table 3. In the speculative assembly code version set out in Table 4, faults on speculatively executed memory references are delayed until it is assured that the speculatively executed code is truly needed. When the speculatively executed code is determined to be needed, then any deferred memory faults are raised.

TABLE 4

| //** temp = *d + 1 **// | |
|---|---|
| LDW,speculative 0 (d), temp | ; De-reference d using |
|  | ; speculative version of |
|  | ; LDW which will |
|  | ; defer trapping |
| ADDI 1,temp,temp | ; add 1 to *d |
| //** if((a/b) > 3.2) {**// | |
| FDIV a,b,ftemp | ; divide a by b |
| FCMP, > ftemp,3,2 | ; compare to 3.2 |
| B,n out | ; Conditional branch |
| ; around clause | |
| //** c = temp **// | |
| CHECK 0 (d), temp | ; Check validity of d to |
|  | ; see if it is necessary to |
|  | ; trap, and if so trap |
| COPY temp,c | ; Place incremented |
|  | ; value in c |
| out: | |

The code in Table 4 introduces speculative code. When code within the speculative code makes a memory reference, there is no memory fault until a decision is made that the speculative code would have been executed in code which does not include speculation.

In the code in Table 4, there are two new instructions: "LDW,speculative" and "CHECK". "LDW,speculative" is similar in function to LDW used in the code in Table 3, with the exception that "LDW,speculative" will not raise any memory faults. Further, if a memory fault would have been raised when executing the "LDW,speculative", the value loaded in the target register is undefined.

The instruction "CHECK" is similar in function to LDW used in the code in Table 3, except that "CHECK" only checks to see if a memory fault would have occurred when the LDW would have executed. If a memory fault would have occurred when the LDW would have executed, CHECK performs the trapping which would normally have occurred during the execution of LDW.

In most modern computer architectures, a program can recover from a memory fault by fixing the problem which caused the fault. This is done by redoing the memory reference instruction and then continuing with execution. This presents a real problem when, as discussed above, speculation has resulted in the delay in handling the memory fault. This is because as a result of not detecting the memory fault, a "garbage" value can be loaded when executing a speculative instruction which accesses memory with an invalid pointer. For example, for the code given in Table 4 above, suppose the pointer "d" contains an invalid pointer. If so, any data referenced using pointer "d" will be a garbage value. If this garbage value is used by other instructions, the results of these other operations also will be corrupted. When the memory fault is detected, it will be necessary to recalculate any corrupted values which were tainted by use of the garbage value. The annotations in Table 5 below illustrate what happens when an invalid pointer is used within speculative code.

TABLE 5

//** temp = *d + 1 **//

| | |
|---|---|
| LDW,speculative 0 (d), temp | ; De-reference d using |
| | ; speculative |
| | ; version of LDW which will |
| | ; defer trapping |
| ## Since the pointer "d" is invalid, normally the LDW | |
| command would have resulted in a memory fault. | |
| However, since an LDW, speculative command is used, | |
| the memory fault and associated trap is deferred. | |
| ADDI 1,temp,temp | ; add 1 to *d |
| ## the value "d" is incremented; however, since the | |
| pointer "d" is invalid, *d is a garbage value, and the | |
| result of the incrementation is also a garbage value. | |

// if((a/b) > 3.2) {//

| | |
|---|---|
| FDIV a,b,ftemp | ; divide a by b |
| FCMP, > ftemp,3,2 | ; compare to 3.2 |
| B,n out | ; Conditional branch around |
| | ; clause |

// c = temp //

| | |
|---|---|
| CHECK0(d),temp | ; Check validity of d to see if |
| | ; it is necessary to trap, and |
| | ; if so trap |
| ## At the CHECK instruction, it is recognized that pointer | |
| "d" is a bad value, and a trap occurs. The trap handler | |
| desires to correct pointer "d" to be a good pointer and to | |
| redo the operation. If speculation had not been done, the | |
| trap handler could make the corrections and then load | |
| the value "*d" into "temp". However, in this case where | |
| speculation has occurred, the incrementation has | |
| already occurred, and without some sort of recovery, the | |
| incrementation will not be reflected in the value loaded | |
| into c and thus the code will not operate properly. | |
| COPY temp,c | ; Place incremented value |
| | ; in c |
| out: | |

One solution to the problem described in the annotation to the code in Table 5 of how to recover from memory fault in speculated code is to generate, by optimizer 94, speculation recovery code which can be utilized when memory faults occur in code which is executed speculatively.

For example, speculative recovery code for the code set out in Table 5 is the line of code set out in Table 6 below:

TABLE 6

ADDI 1,temp,temp

Thus the recovery code re-performs any operations which were done using a "garbage" value created by the speculative memory reference prior to discovery of a memory fault when the operation "CHECK" is performed.

One problem with this solution is that recovery code can be expensive in terms of space. Optimizer 94 would like to utilize many speculative operations, but the recovery code can take up a significant amount of space in the executable file. This represents an inefficient use of space since generally it is extremely rare for a program to need to perform the kind of memory fault recovery described above.

In the preferred embodiment of the present invention, optimizer 94 does not generate any speculative recovery code. Rather, dynamic translator 100 generates any needed speculative recovery code at run time. This speculative recovery code then becomes part of translated code 101 and can be stored in translated code cache 20.

In order to generate the speculative recovery code, dynamic translator 100 essentially creates translated code which re-performs any operations which were executed using a "garbage" value created by the speculative memory reference prior to discovery of a memory fault.

Figure 2:
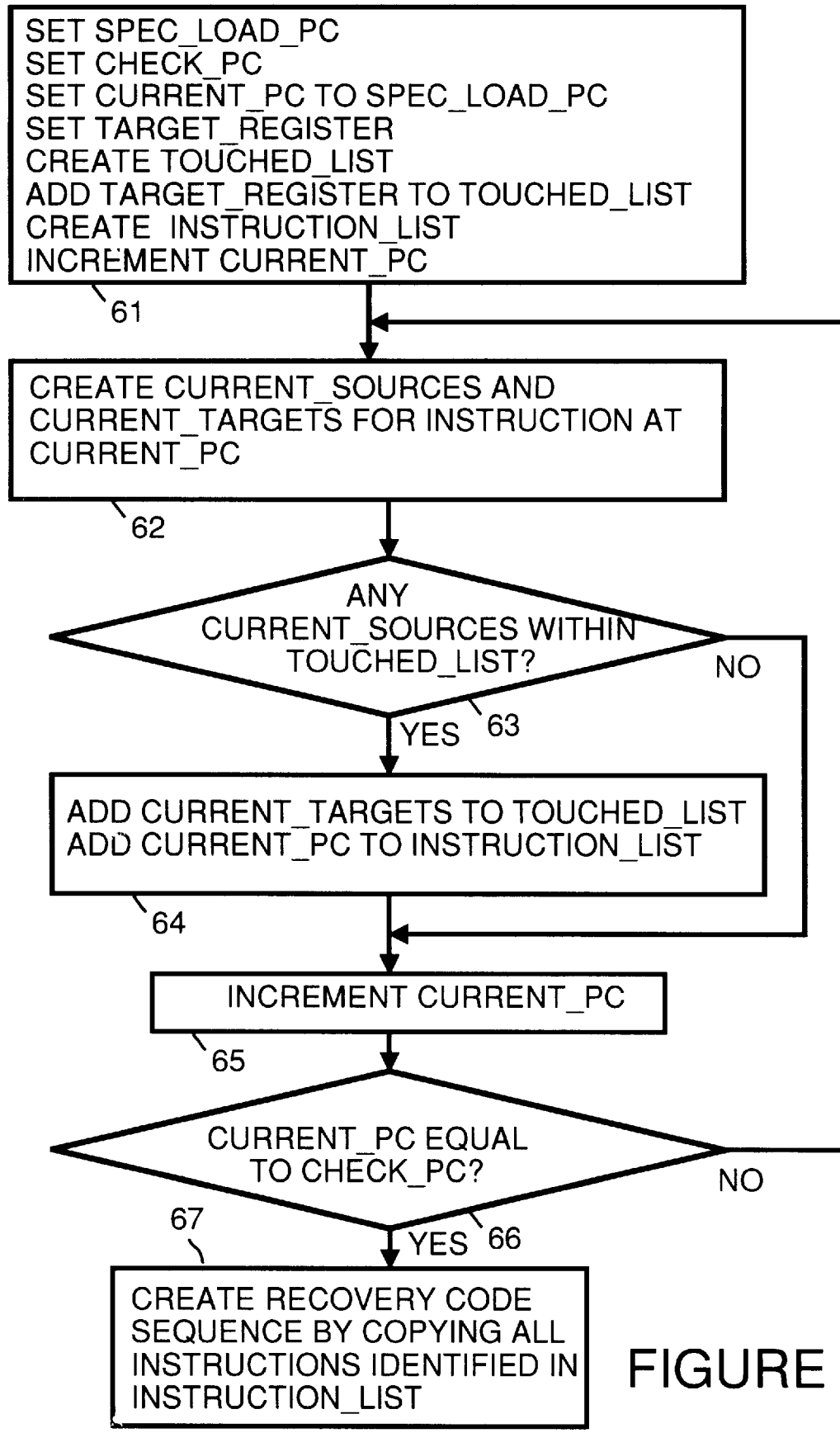
FIG. 2 is a flowchart which illustrates how a dynamic translator analyzes object code within application executable code and generates recovery code sequences in accordance with a preferred embodiment of the present invention.

FIG. 2 is a flowchart which illustrates how dynamic translator 100 analyzes object code within application executable code 41 and generates recovery code sequences. The flowchart applies when a user wishes to recover from a deferred trap.

In a step 61, various initializations are performed. A variable SPEC_LOAD_PC is set to the address of the speculated memory reference instruction associated with the deferred trap. The variable CHECK_PC is set to the address of instruction which caused the deferred trap to be expressed. The variable CURRENT_PC is set to the current value of the variable SPEC_LOAD_PC. The variable TARGET_REGISTER is set to the target register of the instruction at SPEC_LOAD_PC. TOUCHED_LIST is created and initialized as a NULL list of registers. TARGET_REGISTER is then added to TOUCHED_LIST. INSTRUCTION_LIST is created and initialized as a NULL list of instruction addresses. CURRENT_PC is then incremented to point to the instruction following CURRENT_PC.

In a step 62, the instruction at CURRENT_PC is examined and a list of all of its source registers (CURRENT_SOURCES) and all of its target registers (CURRENT_TARGETS) is created.

In a step 63, a determination is made as to whether any of CURRENT_SOURCES are contained within TOUCHED_LIST. If so, in a step 64, then CURRENT_TARGETS is added to TOUCHED_LIST and CURRENT_PC is added to INSTRUCTION_LIST. If in step 63 none of CURRENT_SOURCES are contained within TOUCHED_LIST, step 64 is skipped.

In a step 65, CURRENT_PC is incremented to point to the instruction following CURRENT_PC. In a step 66, a determination is made as to whether CURRENT_PC is equal to CHECK_PC. If not, steps 62 through 66 are repeated. If in step 66 CURRENT_PC is equal to CHECK_PC, then in a step 67, a recovery code sequence is created by copying all instructions identified in INSTRUCTION_LIST.

Table 7 below sets out pseudo-code which implements the flowchart set out in FIG. 2 and thus further illustrates how dynamic translator 100 analyzes object code within application executable code 41 and generates recovery code sequences.

TABLE 7

```
if (user wishes to recover from deferred trap) {
    set SPEC_LOAD_PC to address of speculated memory
        reference instruction associated with the deferred trap
    set CHECK_PC to address of instruction which caused the
        deferred trap to be expressed
    set CURRENT_PC to SPEC_LOAD_PC
    examine the instruction at SPEC_LOAD_PC and set
        TARGET_REGISTER to its target register
    create a NULL list of registers named TOUCHED_LIST
    add TARGET_REGISTER to TOUCHED_LIST
    create a NULL list of instruction addresses named
        INSTRUCTION_LIST
    set CURRENT_PC to the instruction following
        CURRENT_PC
    set DONE = FALSE
    while (not DONE) do {
        examine instruction at CURRENT_PC and create a list
            of all of its source registers (CURRENT_SOURCES)
            and all of its target registers (CURRENT_TARGETS)
        if any of CURRENT_SOURCES are contained within
            TOUCHED_LIST then
            add CURRENT_TARGETS to TOUCHED_LIST and
            add CURRENT_PC to INSTRUCTION_LIST
        set CURRENT_PC to the instruction following
            CURRENT_PC
        if CURRENT_PC is equal to CHECK_PC then set DONE
            to true
    }
    create recovery code sequence by copying all instructions
        identified in INSTRUCTION_LIST
}
```

In some cases, particularly when control flow makes it ambiguous which instruction follows CURRENT_PC, supplemental information is supplied, for example by optimizer 94 in the form of code annotations. These code annotations are utilized by dynamic translator 100 when analyzing control flow.

In another alternative embodiment of the present invention, optimizer 94 generates a compact representation of the necessary recovery code. This compact representation of the recovery code is either interpreted when needed, or used as a template for recovery code generation. This embodiment may be used in conjunction with the use of dynamic translator 100 generating recovery code.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for executing on a computing system, programming code which includes speculative code which is speculatively executed, the method comprising the steps of:
   (a) executing a speculative sequence of code, including the following substep:
      (a.1) for instructions within the speculative sequence of code which include memory accesses, ignoring memory faults; and,
   (b) when utilizing data generated during the speculative sequence of code at runtime, performing the following substeps:
      (b.1) determining whether any memory fault occurred when the speculative sequence of code was executed, and
      (b.2) when in substep (b.1) it is determined that a memory fault occurred when the speculative sequence of code was executed, performing the following substep:
         (b.2.1) generating recovery code which when executed performs a recovery from the memory fault.

2. A method as in claim 1, wherein substep (b.2.1) includes creating translated code which, when executed, re-performs any operations which were corrupted by the memory fault.

3. A method as in claim 1, substep (b.2) additionally comprises the following substep:
   (b.2.2) executing the recovery code generated in substep (b.2.1).

4. A method as in claim 1, wherein substep (b.2.1) includes using code annotations provided by an optimizing compiler, the optimizing compiler inserting the code annotations into the programming code during compile time.

5. A method as in claim 1, wherein substep (b.2.1) includes using a compact representation of the recovery code provided by an optimizing compiler, the optimizing compiler inserting the compact representation of the recovery code into the programming code during compile time.

6. A method as in claim 1, wherein substep (b.2.1) is performed by a dynamic translator.

7. Storage media which stores software which when executed on a computing system performs a method for executing programming code which includes speculative code which is speculatively executed, the method comprising the steps of:
   (a) executing a speculative sequence of code, including the following substep:
      (a.1) for instructions within the speculative sequence of code which include memory accesses, ignoring memory faults; and,
   (b) when at runtime utilizing data generated during the speculative sequence of code, performing the following substeps:
      (b.1) determining whether any memory fault occurred when the speculative sequence of code was executed, and
      (b.2) when in substep (b.1) it is determined that a memory fault occurred when the speculative sequence of code was executed, performing the following substep:
         (b.2.1) generating recovery code which when executed performs a recovery from the memory fault.

8. Storage media as in claim 7, wherein substep (b.2.1) includes creating translated code which, when executed, re-performs any operations which were corrupted by the memory fault.

9. Storage media as in claim 7, substep (b.2) additionally comprises the following substep:
   (b.2.2) executing the recovery code generated in substep (b.2.1).

10. Storage media as in claim 7, wherein substep (b.2.1) includes using code annotations provided by an optimizing compiler, the optimizing compiler inserting the code annotations into the programming code during compile time.

11. Storage media as in claim 7, wherein substep (b.2.1) includes using a compact representation of the recovery code provided by an optimizing compiler, the optimizing compiler inserting the compact representation of the recovery code into the programming code during compile time.

12. Storage media as in claim 7, wherein substep (b.2.1) is performed by a dynamic translator.

13. A computing system comprising:

programming code which includes speculative code which is speculatively executed;

an executing means for executing the programming code, the programming code being optimized so that for instructions within the speculative sequence of code which include memory accesses, memory faults are ignored; and, a dynamic translator which at runtime generates recovery code for a memory fault, the memory fault occurring when the speculative sequence of code is executed and the memory fault being discovered when utilizing data generated during execution of the speculative sequence of code;

wherein the recovery code performs a recovery from the memory fault when executed by the executing means.

14. A computing system as in claim 13, wherein the dynamic translator creates translated code which, when executed by the execution means, re-performs any operations which were corrupted by the memory fault.

15. A computing system as in claim 13, wherein the dynamic translator uses code annotations provided within the programming code to generate the recovery code.

16. A computing system as in claim 13, wherein the dynamic translator uses a compact representation of the recovery code provided within the programming code to generate the recovery code.

17. A computing system as in claim 13, additionally including code generation means for compiling and optimizing source code to produce the programming code.

18. A computing system as in claim 17 wherein the code generation means includes a compiler and an optimizer, wherein the optimizer generates the speculative code.

* * * * *